Figure 1:
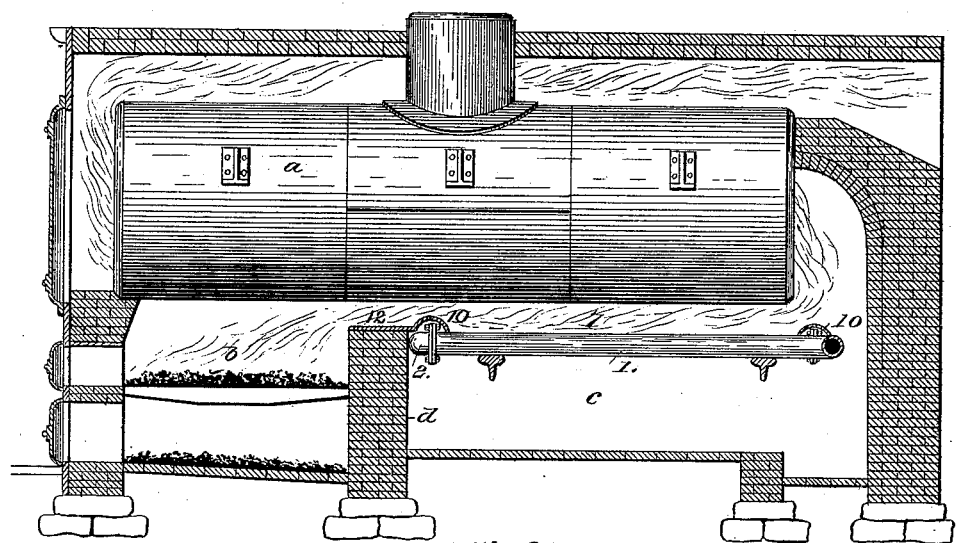

(No Model.)

W. E. RITCHIE.
AIR HEATING FLAME BED PIPE FOR STEAM BOILERS.

No. 443,334. Patented Dec. 23, 1890.

WITNESSES:
Edwin L. Bradford
Howell Bartle

INVENTOR
William E. Ritchie
BY Johnson & Johnson
his ATTORNEYS.

UNITED STATES PATENT OFFICE.

WILLIAM E. RITCHIE, OF PATCHOGUE, NEW YORK, ASSIGNOR TO HIMSELF AND CHARLES J. RYDER, OF SAME PLACE.

AIR-HEATING FLAME-BED PIPE FOR STEAM-BOILERS.

SPECIFICATION forming part of Letters Patent No. 443,334, dated December 23, 1890.

Application filed September 5, 1890. Serial No. 364,009. (No model.)

*To all whom it may concern:*

Be it known that I, WILLIAM E. RITCHIE, a citizen of the United States, residing at Patchogue, in the county of Suffolk and State of New York, have invented new and useful Improvements in Air-Heating Flame-Bed Pipes for Steam-Boilers, of which the following is a specification.

My improvement is directed to a novel construction of flame-bed pipes and their combination and relation to the boiler, the furnace, and to an air-chamber, and also to provision for protecting the flanges and bolts of the pipe-joints from the direct impingement of the flame.

My improvement provides a comparatively close flame-bed, so as to hold the flame more effectively against the boiler and permit the air to pass in thin sheets up between the pipes to supply combustion, and gives the advantage of removing and renewing any one of the pipe-sections without disturbing the others or taking out the flame-bed.

A platform of pipes formed like a coil of rope without joints or couplings has been used as a flame-bed to the boiler for heating feed-water for the same, and a platform of pipes composed of sections united at their ends by semicircular screw-threaded couplings has been used in the flame-passage beneath the boiler for heating air. In the first plan the jointless feed-water pipe will expand and contract equally throughout its length; but when any one part of the pipe becomes burned out the whole pipe-platform must be removed and a new one put in its place. It cannot be repaired within the furnace. In the second plan the screw-end couplings of the pipes are found to be objectionable because of their liability to open under the expansion and contraction of the pipes, and when any one of the pipe-sections becomes cut the whole pipe-platform must be removed and a new one put in its place. It cannot be repaired within the furnace. Moreover, the use of the screw-couplings requires too wide a space between the pipes to give the best results as a flame-deflecting surface. My improved pipe-platform avoids these objections, because I use pipe-sections 1, which are formed with a return-bend 2 at one end only, terminating in a flange 3, which abuts against the straight flanged end 4 of the next contiguous pipe, and the flanges are bolted together with any suitable fire-proof packing. The joint-flanges are cut away at 5 to permit the pipes to be placed quite close together, and thereby form a practically closed flame-bed to obtain the full advantage of a deflecting-surface, while permitting thin sheets of air to pass up through the spaces 6 between them to supply combustion in the flame-passage 7 back of the bridge-wall $d$, and thereby more effectively hold the flame up in contact with the boiler $a$. In this construction the bend 2 of one pipe-section will be at one end and the bend of the contiguous pipe-section will be at its opposite end, and both bends will be on the side on which the sections are joined to form the platform. This construction provides a joint that will withstand the heat and permit expansion and contraction of the joined sections. It permits of applying the air-heating platform of pipes and arranging them under steam-boilers already set in the brick-work, as the pipe-sections can be put together separately within the chamber and flue-space which exists under all horizontal tubular boilers. It permits the repair of the pipe-platform by removing a worn-out section and replacing it by a new one without disturbing the platform as a body, because the joints are accessible and the pipe-sections can be readily separated and put together within the furnace-space. It gives the advantage of excluding the flame from the air-chamber $c$ by bringing the pipe-sections closer together than would be possible with the pipes hitherto used, and thereby renders this air-chamber more effective in supplying air at the surface of the flame-bed in sheet-like streams through the narrow opening 6 between the sections, for it will be understood that in pipe-platforms in which these openings are wide the flame will dive down between the pipes into the air-chamber instead of being supported close under the boiler in its passage to the exit-flue.

My improved pipe-platform forms a more effective division between the flame-bed and the air-supplying chamber and forms a more effective deflecting-surface for causing the flame to impinge against the boiler, and thereby increases the effectiveness of the heat for the generation of steam and increases the heat of the air as a drying medium. For this purpose I have used the pipe-platform in connection with a fan-blower 8, connected with one end of the pipe, the other end 9 of which delivers the hot air into the room in which the goods—such as paper, cotton, or woolen fabrics—to be dried are carried over and upon drying-frames in the usual manner, and in such work the drying is effected without additional cost in fuel where the boiler is used for power purposes.

In using the flanged joined pipes that portion of the flanges and their bolts at the flame-bed surface would be liable to be cut away by the direct impingement of the flame, and particularly at the bridge-wall, and the flame-bed from this cause would require more frequent renewal. To avoid this objection and greatly increase the durability of the flame-bed pipes, I provide a cap or cover 10, placed across the platform over the flanges, so as to protect them and cause the flame to pass over them, and such cover at the bridge-wall may also cover the top of the latter, as a flat plate 12.

Figure 2:
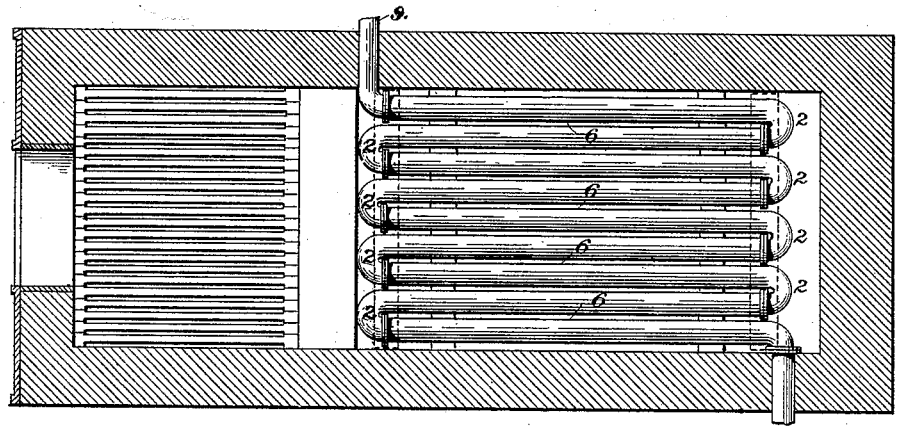
Figure 3:
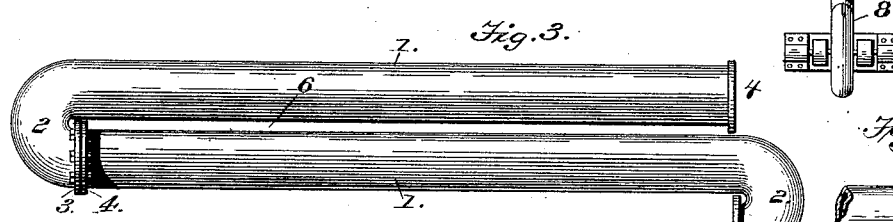
Figure 5:
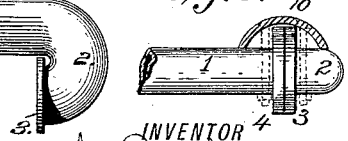
Figure 4:
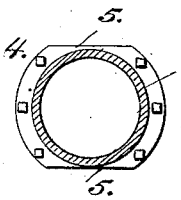

Referring to the accompanying drawings, Figure 1 shows in central sectional elevation a steam-boiler and its furnace having my improved air-heating pipe-platform applied thereto as a flame-bed. Fig. 2 is a sectional plan view showing the flame-bed pipes. Fig. 3 shows two of the pipe-sections in the relation they occupy in joining them to form the flame-bed of the boiler. Fig. 4 shows in cross-section the cut-away flange of the pipe for the purpose stated, and Fig. 5 shows the cap or cover for the pipe-flanges.

The boiler $a$ and its furnace $b$ are mounted in a suitable foundation, in which an air chamber or pit $c$ is made beneath the boiler back of the fire-bridge $d$. The pipe-platform is supported horizontally at the top of this chamber on a line with the top of the fire-bridge and extends from the latter to the rear of the boiler, where the said air-chamber opens into the boiler, which at the front end of the boiler opens into the top casing of the boiler, so that the latter is practically surrounded by the heat escaping from the furnace.

Referring to this pipe-platform in its use for heating air, the construction which I have shown gives the very important advantage of compactness within the flame-bed, and thereby of using a greater number of pipe-sections in the platform, increasing the length of the pipe exposed to the heat, and thereby heating the air to a higher temperature, and thereby rendering it more effective for drying purposes.

The cap or cover 10, for protecting the pipe-flanges and bolts, is placed over the latter across the pipes and secured to the latter by bolts passed down between the pipes or in any suitable way. These caps 10 are preferably made of metal of curved cross-section, so as to fit snugly over the flanges and not impede the passage of the flame. At that end of the flame-bed next the bridge-wall the flange cap or cover may be extended, as a flat plate 12, over the top of the wall to protect it also. These flange caps or covers may be made of refractory material.

I claim as my improvement—

1. In a stationary steam-boiler, a flame-bed constructed of a pipe-platform composed of pipe-sections, each section having a return flanged bend 2 and a straight flanged end 3, and the said sections bolted together with their return-bends in successive relation at the front and at the rear sides of the said flame-bed, the straight flanged end of one pipe-section being bolted to the return flanged end of the adjacent pipe-section, as shown and described, for the purpose stated.

2. In a stationary steam-boiler, a pipe-platform arranged to form a flame-bed, having its pipe-sections each constructed with a return flanged bend 2 at one end and a straight flanged end 3, the flanges being cut away at 5 to bring the said sections in compact relation to form the narrow openings 6 between the sections and bolted together, the flange of the straight end upon the flange of the bend in successive relation, as shown and described, for the purpose stated.

3. In a stationary steam-boiler, a flame-bed composed of pipe-sections, each having a return flanged bend 2 and a straight flanged end 3, and the said sections bolted together with their return-bends in successive relation at the front and at the rear sides of the said flame-bed, and covers or caps on the upper surface of said flame-bed for the flanged joints, for the purpose stated.

4. The combination of a stationary steam-boiler, the air-chamber $c$, a flame-bed constructed of a pipe-platform having its pipe-sections joined by flanged joints, and caps or covers for said flanges on the upper side of said flame-bed, for the purpose stated.

5. The stationary boiler, the air-chamber, and the flame-bed constructed of flanged pipe-sections, in combination with caps or covers for said flanges and the fire-bridge over and upon which one of said covers extends, for the purpose stated.

In testimony whereof I have hereunto set my hand in the presence of two subscribing witnesses.

WM. E. RITCHIE.

Witnesses:
EDWARD T. MOORE,
HESTER A. SMITH.